(12) United States Patent
Aarts et al.

(10) Patent No.: US 9,129,438 B2
(45) Date of Patent: Sep. 8, 2015

(54) 3D MODELING AND RENDERING FROM 2D IMAGES

(75) Inventors: Petrus Arnoldus Johannes Jacobus Aarts, Laag-Soeren (NL); Hendrikus Josephus Johannes Pullens, Amsterdam (NL)

(73) Assignee: NEDSENSE LOFT B.V., Vianen (NL)

(*) Notice: Subject to any disclaimer, the term of this patent is extended or adjusted under 35 U.S.C. 154(b) by 664 days.

(21) Appl. No.: 13/352,959

(22) Filed: Jan. 18, 2012

(65) Prior Publication Data
US 2012/0183204 A1    Jul. 19, 2012

Related U.S. Application Data

(60) Provisional application No. 61/433,836, filed on Jan. 18, 2011.

(51) Int. Cl.
G06K 9/00 (2006.01)
G06T 15/20 (2011.01)
G06T 19/00 (2011.01)

(52) U.S. Cl.
CPC .............. *G06T 15/205* (2013.01); *G06T 19/006* (2013.01); *G06T 2210/04* (2013.01)

(58) Field of Classification Search
None
See application file for complete search history.

(56) References Cited

U.S. PATENT DOCUMENTS

| 7,102,633 | B2 | 9/2006 | Kaye et al. | |
|---|---|---|---|---|
| 7,376,284 | B2 | 5/2008 | Tao et al. | |
| 7,483,588 | B2 * | 1/2009 | Park | 382/276 |
| 7,657,083 | B2 | 2/2010 | Parr et al. | |
| 7,720,276 | B1 * | 5/2010 | Korobkin | 382/154 |
| 2007/0098290 | A1 * | 5/2007 | Wells | 382/254 |
| 2007/0285419 | A1 | 12/2007 | Givon | |
| 2008/0238916 | A1 | 10/2008 | Ghosh et al. | |
| 2009/0103786 | A1 | 4/2009 | Ives et al. | |
| 2009/0295791 | A1 * | 12/2009 | Aguera Y Arcas et al. | 345/419 |
| 2009/0304265 | A1 | 12/2009 | Khan et al. | |
| 2010/0118122 | A1 * | 5/2010 | Hartman | 348/46 |
| 2010/0118125 | A1 | 5/2010 | Park | |
| 2012/0087580 | A1 * | 4/2012 | Woo et al. | 382/165 |
| 2012/0235997 | A1 * | 9/2012 | Furuhashi et al. | 345/421 |

OTHER PUBLICATIONS

Lee, Sangwon (2007). "Reconstructing 3D Models from Line Drawings," Dissertation, Northwestern University, Chicago. DAI-B 68/09, Mar. 2008. ISBN:9780549220107.

Sainz, Miguel (2003). "Photorealistic Image Based Objects from Uncalibrated Images," Dissertation, University of California, Irvine. VIS '03 Proceedings of the 14th IEEE Visualization 2003 (VIS'03), p. 105, IEEE Computer Society Washington, DC, USA © 2003.

(Continued)

*Primary Examiner* — Thomas Conway
(74) *Attorney, Agent, or Firm* — Levenfeld Pearlstein, LLC

(57) ABSTRACT

A method of converting an image from one form to another form by a conversion apparatus having a memory and a processor, the method including the steps of receiving a captured image, extracting at least one image dimension attribute from the image, calculating at least one dimension attribute of the image based on the image dimension attribute, modifying the image based on the calculated dimension attribute and the extracted dimension attribute, and displaying the modified image on a display unit.

18 Claims, 6 Drawing Sheets

(56) References Cited

OTHER PUBLICATIONS

Kashlev, Dmitry (2008). "Efficient 3D Building Model Generation from 2D Floor Plans," Dissertation, Massachusetts Institute of Technology, Department of Electrical Engineering and Computer Science, Boston.

Chen et al. (2010). "A 2-point Algorithm for 3D Reconstruction of Horizontal Lines from a Single Omni-directional Image", College of Information System and Management, National University of Defense Technology (Changsha, China) and University of Alberta (Edmonton, Canada). Received Feb. 21, 2010.

Moons et al (2009). "3D Reconstruction from Multiple Images: Part 1 Principles", Foundations and Trends® in Computer Graphics and Vision: vol. 4: No. 4, pp. 287-404.

* cited by examiner

3D MODELING AND RENDERING FROM 2D IMAGES

CROSS-REFERENCE TO RELATED APPLICATIONS

This Application claims the benefit of, and is related to, U.S. Provisional Patent Application No. 61/433,836 titled "3D MODELING AND RENDERING FROM 2D IMAGES," filed Jan. 18, 2011, that is incorporated by reference herein to the fullest extent allowed.

FIELD OF THE INVENTION

The present invention is generally related to image generation software which converts a two dimensional image into a three dimensional image.

BACKGROUND OF THE INVENTION

Using conventional methods, the conversion of a two dimensional image into a three dimensional image involves capturing multiple images of an object or a space, and splicing the images together to create a single image. However, during the conversion of a two dimensional image into a three dimensional image, scaling of the converted image is typically not performed. In addition, conventional conversion applications do not incorporate accurate depth measurements into the converted image. Because of this, conventional conversion systems are not capable of realistically representing a room or object in three dimensional form based on a two dimensional image.

A need exists for an image conversion system that allows a user to convert a two dimensional image into a three dimensional image that has accurate height and depth dimensions.

SUMMARY OF THE INVENTION

Various embodiments of the present invention include a method of converting an image from one form to another form by a conversion apparatus having a memory and a processor, the method including the steps of receiving a captured image, extracting at least one image dimension attribute from the image, calculating at least one dimension attribute of the image based on the image dimension attribute, modifying the image based on the calculated dimension attribute and the extracted dimension attribute, and displaying the modified image on a display unit.

Other embodiments include, an image conversion system having a conversion apparatus including an image receiving unit that receives a captured image, a dimension extracting unit that extracts at least one image dimension attribute from the image, an image calculating unit configured to calculate at least one dimension attribute of the image based on the image dimension attribute, an image modifying unit that modifies the image based on the calculated dimension attribute and the extracted dimension attribute, and an image display unit that displays the modified image.

These and other features and advantages of the present invention will be apparent from the following detailed description, in conjunction with the appended claims.

BRIEF DESCRIPTION OF THE DRAWINGS

Details of the present invention, including non-limiting benefits and advantages, will become more readily apparent to those of ordinary skill in the relevant art after reviewing the following detailed description and accompanying drawings, wherein.

DESCRIPTION

While the present disclosure is susceptible of embodiment in various forms, there is shown and described herein below, and in the attached pages, one or more embodiments with the understanding that the present disclosure is to be considered illustrative only and is not intended to limit the disclosure to any specific embodiment described or illustrated.

The present disclosure is directed to systems and methods for rendering one or more two dimensional images, e.g., photographs and/or video, into a three dimensional virtual environment, or background, that can be manipulated by arranging three dimensional virtual objects in the three dimensional environment, altering lighting, changing textures and colors, etc, and presenting the altered two dimensional image from a virtual camera viewpoint, and with a virtual camera orientation, that can be interactively changed. In one non-limiting example, one or more photographs are taken of a room, such as a living room, and the photograph(s) are rendered into a three dimensional virtual environment of the room generally according to the following steps: receiving suitable image(s), such as a picture taken with a fixed focal length, having a view that is substantially not rotated or tilted about an optical axis, and showing at least two walls of the room and the ceiling and floor; removing foreground objects from the image(s); identifying corners of the room and inputting a ceiling height; and surveying the lighting in the image(s), such as by identifying positions and types of light sources, which can be used to shade three dimensional virtual objects (e.g., chairs) and planes (e.g., floors) consistently with the image(s). Three dimensional virtual objects can be rendered from 2D images in a similar manner and/or can be rendered using off-the-shelf software applications. More particularly, the present systems and methods may include rendering various faces of the three dimensional virtual object, e.g., front, back, left, right, top, and bottom faces, defining a three dimensional coordinate system, assigning a size scale and units, and analyzing color and texture of the object. Attached hereto are additional details of the systems and methods to supplement the above description.

Figure 1:
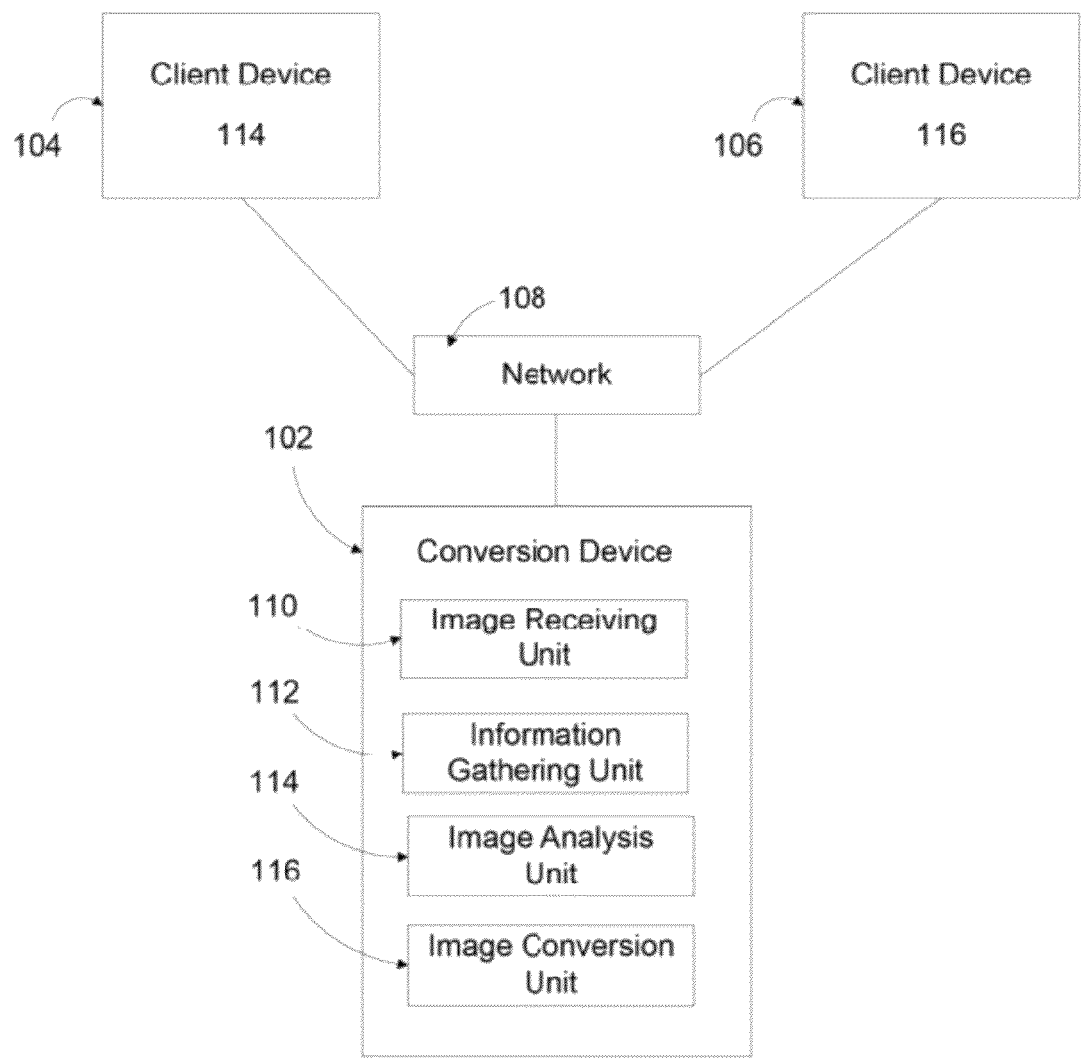
FIG. 1 depicts a block diagram of an image conversion system suitable for use with the methods and systems consistent with the present invention.

FIG. 1 depicts a block diagram of an image conversion system 100 suitable for use with the methods and systems consistent with the present invention. The image conversion system 100 comprises a plurality of computers 102, 104, and 106 connected via a network 108. The network 108 is of a type that is suitable for connecting the computers 102, 104, and 106 for communication, such as a circuit-switched network or a packet-switched network. Also, the network 108 may include a number of different networks, such as a local area network, a wide area network such as the Internet, telephone networks including telephone networks with dedicated communication links, connection-less network, and wireless networks. In the illustrative example shown in FIG. 1, the network 108 is the Internet. Each of the computers 102, 104, and 106 shown in FIG. 1 is connected to the network 108 via a suitable communication link, such as a dedicated communication line or a wireless communication link.

In an illustrative example, computer 102 serves as an image conversion management unit that includes an image receiving unit 110, an information gathering unit 112, an image analysis unit 114, and an image conversion unit 116. The number of computers 102, 104, and 106, and the network 108 configuration, shown in FIG. 1 are merely an illustrative example. One having skill in the art will appreciate that the image conversion system 100 may include a different number of computers and networks. For example, computer 102 may include the input receiving unit 110 as well as the information gathering unit 112. Further, the image analysis unit 114 and image conversion unit 116 may reside on a different computer than computer 102.

Figure 2A:
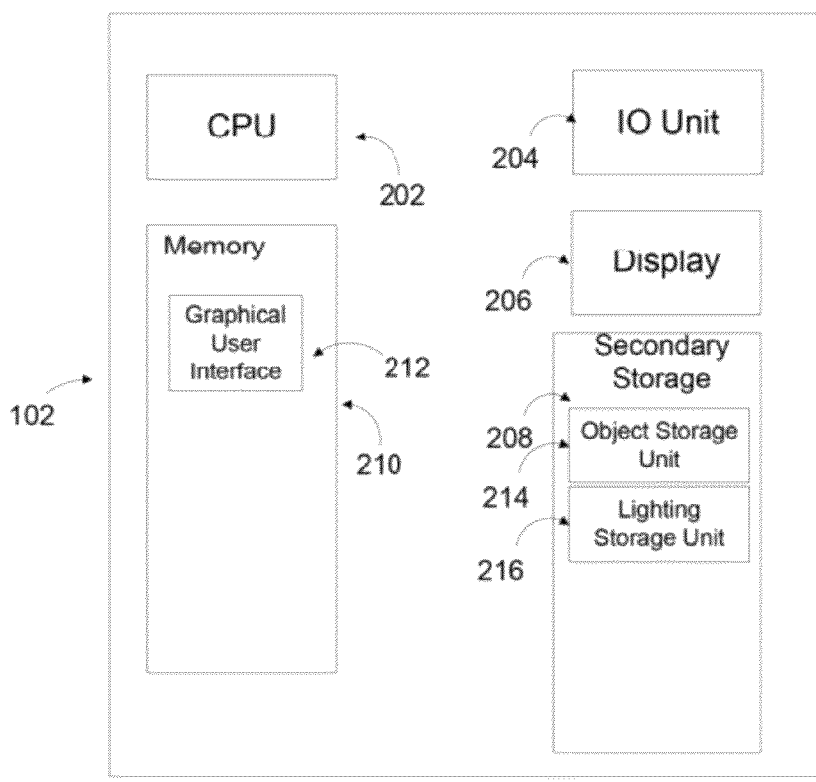
FIG. 2A depicts a computer included in the image conversion system of FIG. 1.

FIG. 2A shows a more detailed depiction of computer 102. Computer 102 comprises a central processing unit (CPU) 202, an input output (I/O) unit 204, a display device 206, a secondary storage device 208, and a memory 210. Computer 102 may further comprise standard input devices such as a keyboard, a mouse, a digitizer, or a speech processing means (each not illustrated).

Computer 102's memory 210 includes a Graphical User Interface ("GUI") 212 that is used to gather information from a user via the display device 206 and I/O unit 204 as described herein. The GUI 212 includes any user interface capable of being displayed on a display device 206 including, but not limited to, a web page, a display panel in an executable program, or any other interface capable of being displayed on a computer screen. The secondary storage device 208 includes an object storage unit 214 and a lighting storage unit 216, which will be discussed herein. Further, the GUI 212 may also be stored in the secondary storage unit 208. In one embodiment consistent with the present invention, the GUI 212 is displayed using commercially available hypertext markup language ("HTML") viewing software such as, but not limited to, Microsoft Internet Explorer, Google Chrome, or any other commercially available HTML viewing software.

Figure 2B:
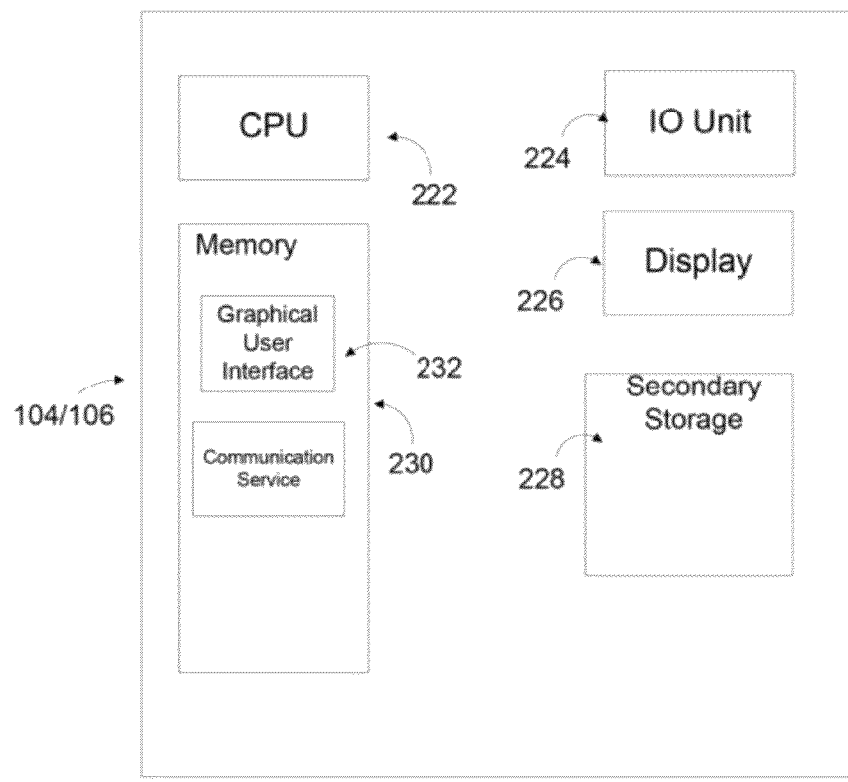
FIG. 2B depicts user computers included in the image conversion system of FIG. 1.

FIG. 2B shows a more detailed depiction of user computers 104 and 106. User computers 104 and 106 each comprise a central processing unit (CPU) 222, an input output (I/O) unit 224, a display device 226, a secondary storage device 228, and a memory 230. User computers 104 and 106 may further each comprise standard input devices such as a keyboard, a mouse, a digitizer, or a speech processing means (each not illustrated).

User computers 104 and 106 memory 230 includes a GUI 232 which is used to gather information from a user via the display device 226 and I/O unit 224 as described herein. The GUI 232 includes any user interface capable of being displayed on a display device 226 including, but not limited to, a web page, a display panel in an executable program, or any other interface capable of being displayed on a computer screen. The GUI 232 may also be stored in the secondary storage unit 228. In one embodiment consistent with the present invention, the GUI is displayed using commercially available HTML viewing software such as, but not limited to, Microsoft Internet Explorer, Google Chrome or any other commercially available HTML viewing software.

Figure 3:
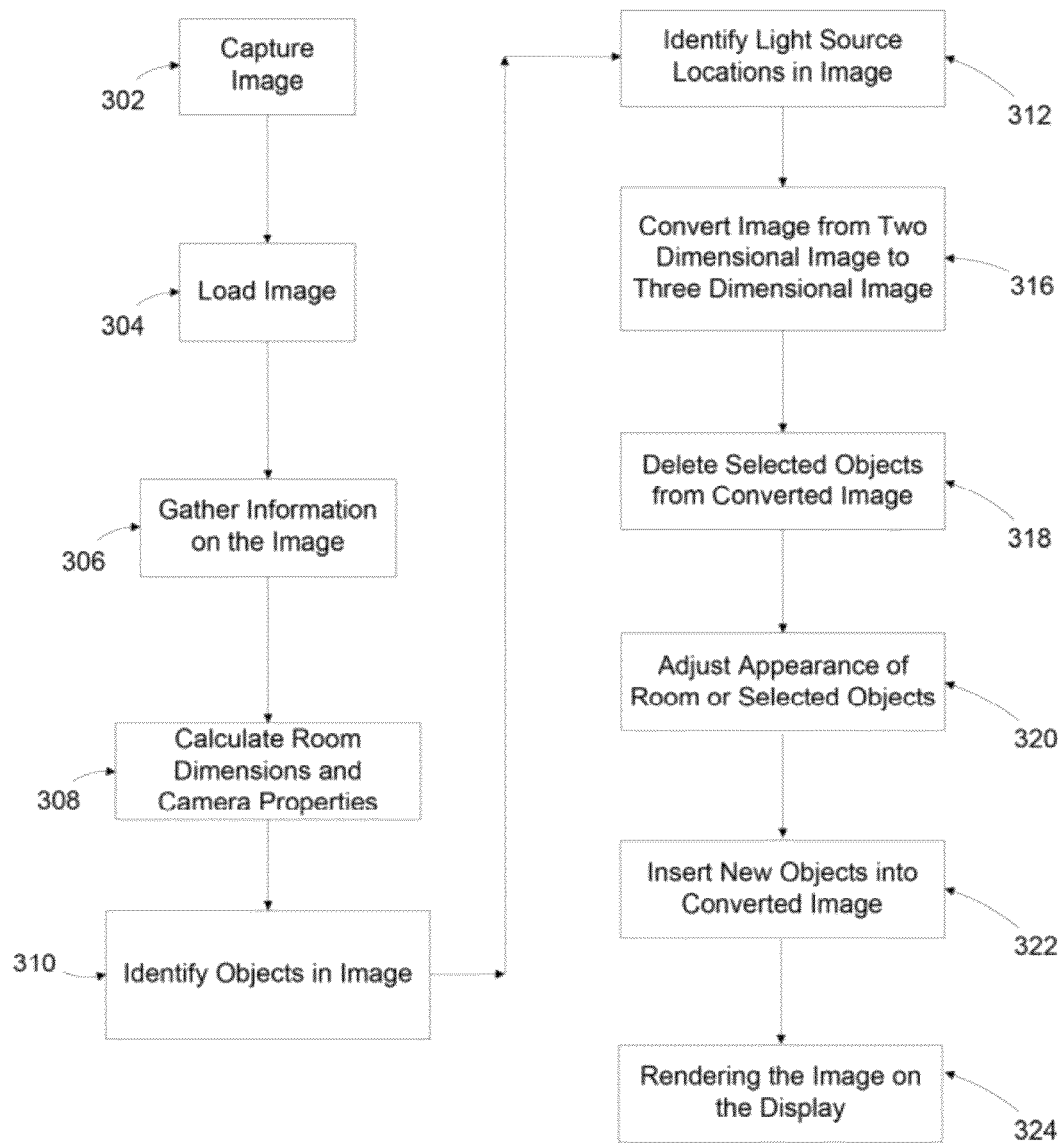
FIG. 3 illustrates a process performed by the image conversion system of FIG. 1.

FIG. 3 illustrates a process performed by the image conversion system 100. In step 302, an image is captured by an image capturing unit communicatively coupled to a computer 102, 104, or 106. The image may be captured using any conventional image capturing device such as, but not limited to, a digital camera or any other device capable of capturing an image and converting the image into a digital format. The image is transmitted to the image receiving unit 110 operating in the memory of the computer 102 in step 304 using any conventional information transferring method.

In step 306, information concerning the captured image is gathered by the information gathering unit 112. The information gathering unit 112 may prompt a user to enter information concerning the image including, but not limited to, the focal length of the image capturing unit, whether a flash was used during the capture of the image, the location where the image was taken, and the time of image capture. In another embodiment, the information is extracted from the image using any conventional image information extraction method including, but not limited to, analyzing the EXIF information embedded in the image. The information gathering unit 112 may also retrieve additional information concerning the image from the image capturing device, such as the geographical location of the user capturing the image via a global positioning system (GPS) receiver coupled to the image capturing device. In step 308, the image analysis unit 114 determines the physical dimensions of the room in which the image was captured, based on the image information.

In step 310, the image analysis unit 114 identifies objects in the image. The image analysis unit 114 may identify objects in an image by analyzing the pixels in the image to determine lines where the pixel colors change from one color to another. The image analysis unit 114 may also identify objects by comparing areas identified in the image to a database of known images. In step 312, the image analysis unit 114 identifies the source of light into the room and direction from which the light enters the room and strikes objects in the room. The image analysis unit 114 may utilize the information gathered by the information gathering unit 112 in determining the source of light into the room.

In step 316, the image conversion unit 116 converts the image from a two dimensional image into a three dimensional image using the dimensions of the room. The image conversion unit 116 generates a three dimensional plane for each wall of the room, and stores these planes in the memory 210. In addition, the image conversion unit 116 converts each object in the room into a three dimensional object by relating the dimensions of each object to the dimensions of the room and the position of each object within the room.

In step 318, the image conversion unit 116 presents the converted image to the user via the GUI 232 coupled to the user device 104 or 106. Objects within the converted image are selectable by the user such that the user may move the object within the converted image or delete the object from the image entirely. Once an object is deleted from the converted image, the image analysis unit 114 and image conversion unit 116 generate a revised image without the object as will be discussed herein.

In step 320, the image conversion unit 116 adjusts the appearance of the room, or a selected object in the room, based on viewing information gathered by the GUI 232. Objects, walls, the floor, and the ceiling are displayed on the display unit 226 of the user computer 104 or 106 such that a user may select a wall, object, floor, or ceiling, and change the attributes of the selected item. The attributes may include, but are not limited to, the texture or color of the selected item. The image conversion unit 116 adjusts the appearance of the selected items based on the calculated light source and dimensions of the room.

In step 322, the GUI 232 on the user device 104 or 106 displays a list of objects to insert into the converted image from the object storage unit 210 in the secondary storage 208 of the computer 102. The objects in the object storage unit 210 include information concerning each object listed including, but not limited to, the dimensions of the object, the color of the surfaces of the object, the composition of each surface and the reflective characteristics of each surface. The image conversion unit 116 gathers the information on each object along with the position and intensity of the lighting sources of the room, and renders the object in the room with accurate depictions of how the image would appear in the room.

In step 324, the image conversion unit 116 renders the image on the display unit 226. The rendering of the room is performed from a predetermined viewing location and orientation that may be adjusted by a user via the GUI 232. The rendering may be performed by the image conversion unit 116 by at least one CPU 202 or 222 in at least one computer. A user may adjust the viewing location such that the image is viewed from different virtual locations. As an illustrative example, a user may move the viewing location to a virtual location above the room. The image conversion unit 116 is configured to adjust the image such that the image, and all objects in the image, are viewed from a viewing location above the room.

Figure 4:
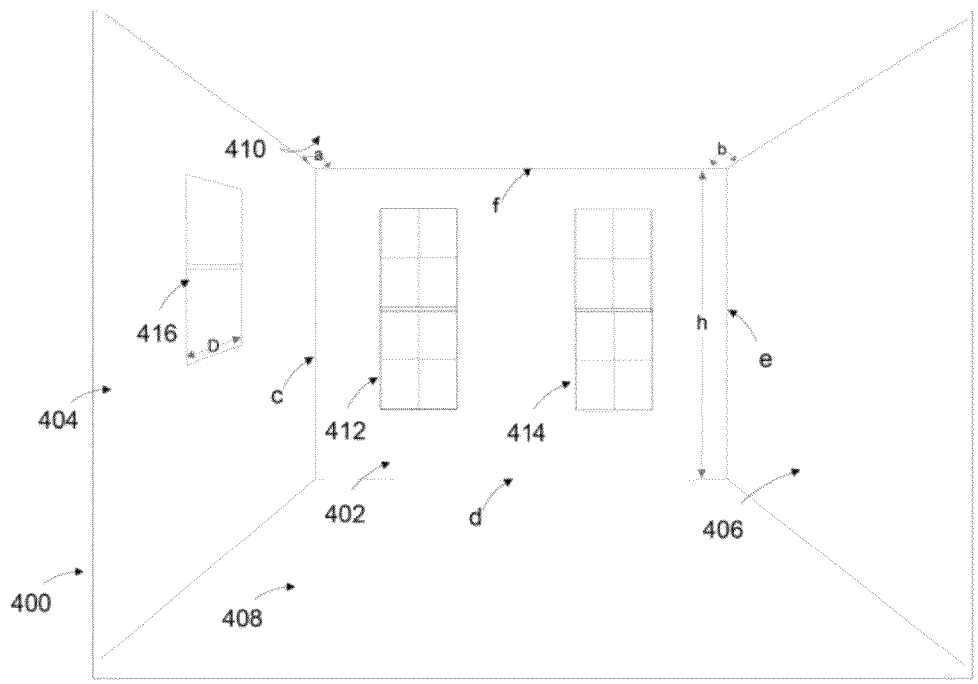
FIG. 4 depicts an image of a room to be converted by the image conversion system of FIG. 1.

FIG. 4 depicts a two dimensional image 400 of a room captured by an image capture device. The image 400 includes a back wall 402 having a height (h), a left sidewall 404, a right sidewall 406, a floor 408, and a ceiling 410. The back wall 402 and the right side wall 406 are separated by an angle a. The back wall 402 and the left sidewall 404 are separated by the angle b. The back wall 402 also includes two windows 412 and 414, and the left sidewall 404 includes a window 416.

The GUI 232 may gather information on the depth of the image 400. As an illustrative example, the width D of the window 416 may be gathered to determine the depth of the image, where the depth of the image represents a length in the image in a direction parallel to the sidewalls 404 and 406 towards the back wall 402. The room 400 may also be represented by an image including only two visible walls, walls that are only partially visible, images not showing the ceiling or floor, or an image angled from an optical plane. The image may be angled from the optical plane by 30 degrees or less.

Figure 5:
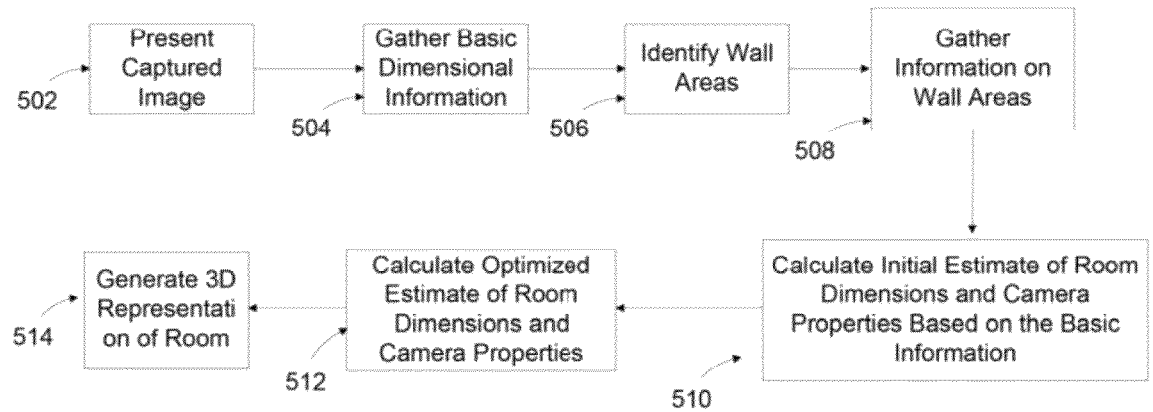
FIG. 5 illustrates a process of determining the dimensions of a room from the image of FIG. 4.

FIG. 5 illustrates a process of determining the dimensions of a room from an image 400. In step 502, the information gathering unit 112 presents the image 400 to a user via the GUI 232 on the client device 104/106. In step 504, the information gathering unit 114 receives basic dimensional information of the image via the GUI 232, and from the information stored in the image such as EXIF information. The basic dimensional information may include the ceiling to floor height h of the room 400 depicted in the image 400, the angles a and b between the back wall 402 and the sidewalls 404 and 406 in the image 400, the length of lines that form intersections between walls 402, 404, and 406, the ceiling 410, and the floor 408, a depth dimension such as the width of an object or feature on one of the sidewalls 404 or 406 (i.e. the width D of the window 416). The GUI 232 may allow a user to draw lines over the image indicating the intersections of the walls 402, 404, and 406 in the image. The image analysis unit 114 may also use a line analysis algorithm to identify where the lines that forms the intersections between the walls 402, 404, and 406 in the image. The line analysis algorithm may include a Hough transform algorithm or any other image line analysis algorithm that is known in the art.

In step 506, the image analysis unit 114 identifies the walls 402, 404, and 406 displayed in the image 400 based on the information gathered from the information gathering unit 112. The walls 402, 404, and 406 are identified in the image as the pixels in the captured image contained in the non-self-intersecting polygons formed by pairs of neighboring lines which form the intersection between walls. As an illustrative example, referring to FIG. 4, the back wall 402 is defined by area between the lines c, d, e, and f.

In step 508, the image analysis unit 114 gathers information on each wall 402, 404, and 406. The information may include the color of each wall, objects positioned near each wall such as furniture, and any windows or openings in each wall. To gather this information, the image analysis unit 114 systematically analyzes the pixels in each wall to determine the colors of each wall, and the relative location of each color on each wall. In addition, the image analysis unit 114 analyzes the pixels in each wall to determine any objects positioned in front of the wall.

In step 510, the image analysis unit 114 calculates an initial estimate of the room dimensions and the image capturing device properties based on the basic dimensional information gathered from the image. First, the initial estimate of all viewing locations and rotation values is set to zero. The initial estimate of the room dimensions is calculated based on the lines identified in the image that indicate the intersections between walls using the approximation of projection with a pinhole camera characterized by the equation:

$$L^I = \frac{f}{z}L^W \qquad \text{(equation 1)}$$

Where $L^I$ denotes the height of the wall as measured in pixels in the image 400, $L^W$ denotes the physical height h of the room in the image 400, f denotes the focal length of the image capture device that captured the image, and z denotes the physical distance between the image capture device and each wall intersection.

The information gathering unit 112 may extract the focal length f from the information stored in the image such as EXIF information, or gather the image capture device focal length via the GUI 232. The image analysis unit 114 may also determine two or more "vanishing" points for the image. A vanishing point being defined as the intersection points of the lines along the edges of the walls as they appear projected in the image 400, from which the focal length f can be calculated directly using the standard camera projection equations that are known in the art. In addition, when the length D in image 400 is defined, the focal length f may be calculated by dividing the room dimensions by a scaling factor that is determined based on the pixel length D in the image and the provided physical length of the ruler D. When the angles a and b in image 400 are greater than or less than 90 degrees, the focal length f may be calculated by the image analysis unit 114 by scaling the room dimensions along the depth direction based on the angles a and b.

In step 512, the image analysis unit 114 performs a Levenberg-Marquardt optimization of the initial values of the room dimensions and the camera properties as calculated in step 510. The optimization consists of the iterative minimization of the cost C, calculated as $C=\Sigma_{i=0}^{n} (y_i - P_i(x, \alpha))^2$, where the set of values y contains the locations in the image 400 of the four corner points of each of the walls 402, 404, and 406, and optionally the locations in the image 400 of the two end points of the ruler D. The vector x consists of the dimensions of the room in the form of the locations in 3D of the floor corner points and the physical room height h. The vector a consists of the camera properties in the form of the 3D location, the 3D orientation, and the focal length of the camera. The function P is the photographic projection of the 3D room geometry in the form of the vector x by the camera as defined by the vector a into the image 400. In the first iteration, the values of x and a as calculated in step 510 are used.

In step 514, a virtual three-dimensional representation of the room in the image 400 is stored in memory 210 of the computer 102 along the optimal vector x, which defines the dimensions of the room, and the information previously gathered in step 508 that defines the appearance of the room.

After the three dimensional representation of the image 400 is rendered, a user may rotate and pan around the image via the GUI 232. When the image is panned, or rotated, the image analysis unit 114 adjusts the dimensions of the room such that the room conveys a view of the room that is substantially identical to the view of a person standing in the same location as the virtual camera. The image analysis unit 114 may consistently adjust the lengths of walls and other object dimensions to ensure the accuracy of the image is maintained.

A user may adjust the viewing location, virtual location, of the user such that the room is viewed from different perspectives. As an illustrative example, if a user changes the viewing location, via the GUI 232, to a position looking into the room from the right sidewall, the image analysis unit 114 renders the image as if the viewer were standing against the right sidewall 406. Since the information pertaining to each wall and object, such as color and texture, are known, the image analysis unit 114 can re-render the image using the calculated dimensions of the room and objects in the room and the stored colors and textures of the objects and walls.

Figure 6A:
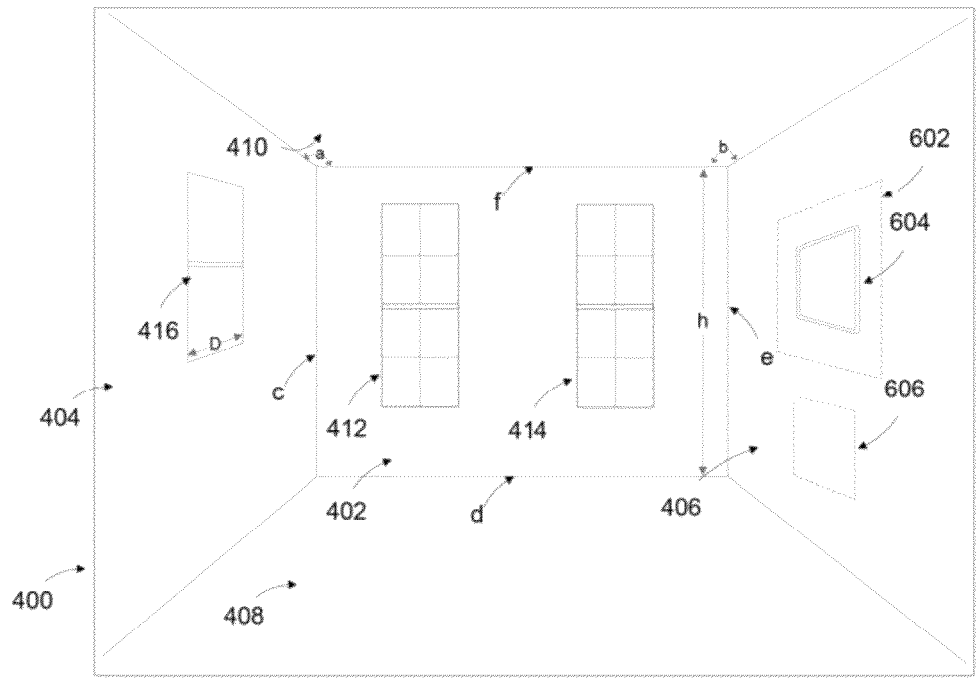
FIG. 6A depicts an image of the room in FIG. 4 that includes a removal area and a sample area.
Figure 6B:
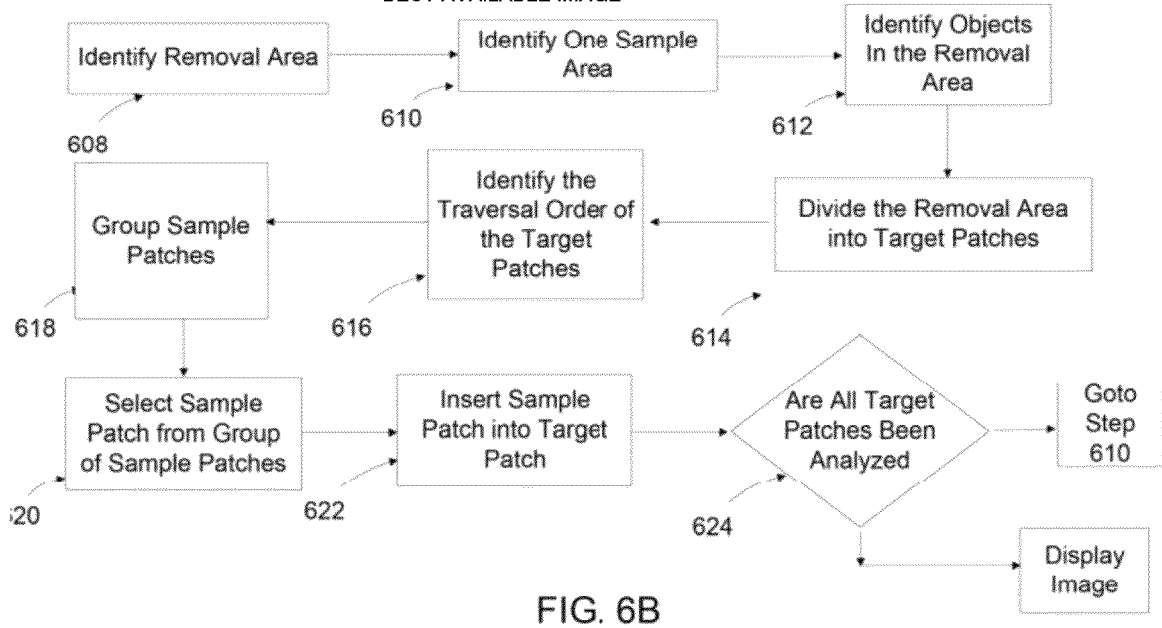
FIG. 6B illustrates a process for removing objects placed in the image of FIG. 4.

FIG. 6A depicts an image 400 of a room that includes a removal area 602 including an object 604 and a sample area 606. The object may be, but is not limited to a picture. FIG. 6B illustrates a process for removing objects placed in front of, or on, the walls 402, 404, and 406 in the image 400. In step 608, the image analysis unit 114 identifies at least one removal area 602 in the image. The GUI 232 may provide tools that allow for the selection of areas within an image where an object may be identified. As an illustrative example, a user may utilize tools that allow a user to draw a box over an area on the image having objects that the user wants removed from the image.

In step 610, the image analysis unit 114 identifies at least one sample area 604 for the identified removal area 602. The sample area 606 represents an area having information that will replace objects removed in the removal area 602. The image analysis unit 114 may identify another portion of the wall outside the picture as the sample area 606 that will be applied to the portion of the image covered by the object 604. The sample area 606 may be identified using the same techniques as identifying the removal area 602.

In step 612, the image analysis unit 114 identifies objects 604 within the removal area 602. The image analysis unit 114 may use any known object identification technique such as edge detection, image matching, or any other known image identification technique. The image analysis unit 114 may utilize a fronto parallel view of the image to identify objects in the removal area 602.

In step 614, the image analysis unit 114 divides the removal area 602 into target patches. The target patches may be of the same size and shape. Each of the target patches represents a portion of the removal area 602 where the pixel information in that area is removed and replaced by the pixel information from the sample area 606. The removal area 602 may be subdivided by covering the removal area 602 with a grid of rectangles with each rectangle in the grid being a target patch. The size of the rectangles in the grid, and therefore the size of each target patch, may be $1/20^{th}$ of the dimension of the image 400. The size of the complete grid may be one and a half times the size of a box bounding the removal area 602 to create an overlap between the removal box and a portion of the image surrounding the removal area 602.

In step 616, the image analysis unit 114 identifies the traversal order of the target patches in the removal area 602. The target patch traversal order may be based on the amount of pixel information available on the borders of each target patch. As an illustrative example, target patches along the edges of the removal area 602 may have pixel information on at least one edge bordering the removal area 602 whereas target patches in the center of the removal area 602 may not have any pixel information on the edges of the target patch. Accordingly, the traversal order may place target patches on the border of the removal area earlier in the traversal order than target patches not bordering the edges of the removal area.

In step 618, a group of sample patches is generated from the identified sample area 606. Each sample patch in the group may be a rectangle of a fixed size that is twenty five percent larger than the size of each target patch. The group of sample patches is created by visiting random locations in each sample area 606, and extracting pixel information from each sample patch. Information is gathered from sample patches in the sample area 606 until information on a predetermined number of sample patches is gathered.

A single linear gradient of random size, and of random orientation, is applied to each potential sample patch. Subsequently, each potential sample patch is multiplied with an intensity correction factor. The intensity correction factor may be within the range of approximately 0.75 to approximately 1.3, and is chosen to provide the best fit to the selected target patch surroundings. The quality measure of the fit is a sum of squared differences calculation between all pixel values in the border region of a potential sample patch, and the pixel values of the pixels surrounding the target patch to which the sample patch is compared. Because the sample patches are larger than the target patches, their border regions overlap with surrounding target regions allowing for the quality measure to utilize the sum of squared difference calculation. The quality measurement is then stored in the memory 210 of the computer 102.

In step 620, a sample patch is randomly selected from a percentage of sample patches having the highest quality measurement. The percentage may be 5 percent, 10 percent, 15 percent or larger of the sample patches in the group. In step 622, the outline of the sample patch that will be inserted into the selected target patch is determined. The outline may be determined by dynamic programming to determine the optimal cut through the border region of the selected sample patch. The border region is defined as the region of the selected sample patch that extends beyond the edges of the selected target patch when the selected sample patch is overlaid on the selected target patch.

In step 624, the selected sample patch is inserted into the selected target patch. Inserting the selected sample patch is defined as replacing the pixel information in the selected target patch with the pixel information of the selected sample patch. Prior to inserting the selected sample patch information into the selected target patch, the selected target patch information is stored in the memory 210.

In step 626, the image analysis unit 114 determines if all target patches have been analyzed. If all target patches have not been analyzed, the process returns to step 616. If all target patches have been analyzed, the completely filled in removal area 602 is presented from the original camera viewpoint.

Figure 7:
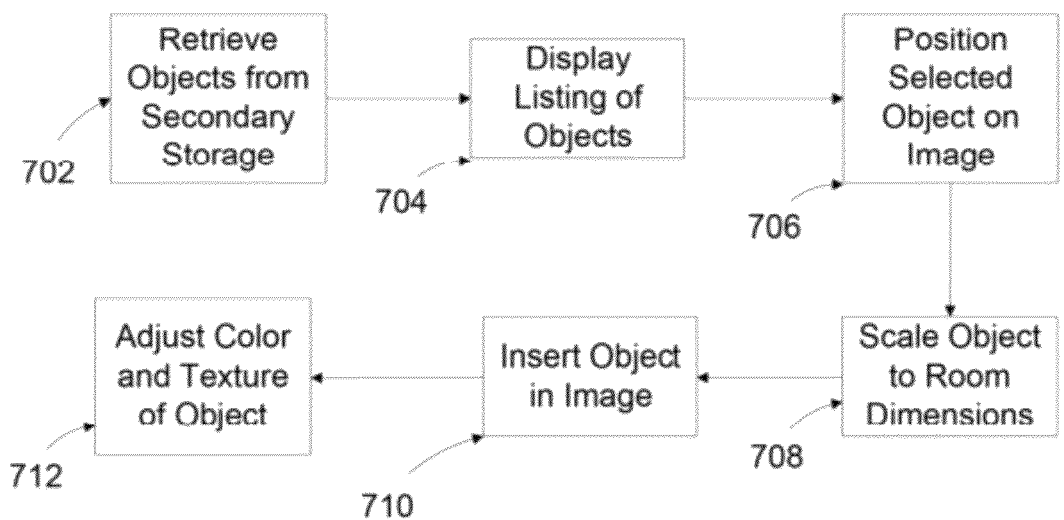
FIG. 7 illustrates a process of inserting a new object into the converted image in FIG. 4.

FIG. 7 illustrates a process of inserting a new object into the converted image. In step 702, a plurality of objects is retrieved from the object storage unit 214 along with sizing information for the object such as height, width and depth. In step 704, the listing of objects is displayed on a portion of the GUI 232 adjacent to the converted image. In step 708, the image analysis unit 114 scales the object based on the dimensions of the room. As an illustrative example, if the object selected is a chair that is 0.45 meters (18 inches) tall would be scaled such that the height of the chair would be represented as the equivalent height in the image. In step 710, the object is rendered in the image. In step 712, the object color and texture is adjusted based on information gathered by the GUI 232. The objects may include, but are not limited to, furniture, clothing, window treatments, pictures, mechanical devices such as vents, soffits, and fans, light fixtures, and consumer electronics such as speakers, video display devices, computers, and mobile phones. The objects may also include art, sculptures, or any other object that is related to the image being displayed.

As one having ordinary skill in the art will appreciate, the above referenced methods are not restricted to rooms. Instead, the methods described herein are applicable to any image include, clothing, landscapes, consumer products or any other item that may be captured in a two dimensional image.

It should be understood that various changes and modifications to the embodiments disclosed herein will be apparent to those skilled in the art. Such changes and modifications can be made without departing from the spirit and scope of the present disclosure and without diminishing its intended advantages.

What is claimed:

1. A method of converting a two dimensional (2D) image into a three dimensional (3D) image using an image conversion system, the method including the steps of: receiving a 2D image into an image receiving unit of the image conversion system; receiving at least one gathered image dimension attribute of the 2D image in an information gathering unit of the image conversion system; identifying corners and light sources in a space of the 2D image; calculating at least one calculated dimension attribute of the 2D image based on the gathered image dimension attribute using an image analysis unit of the image conversion system; converting the 2D image into a 3D image using an image conversion unit of the image converting system based on the identified corners the calculated dimension attribute and the gathered dimension attribute, and shading at least one three dimensional object or at least one plane in the space based on the identified light sources; creating a modified image from the 3D image; identifying a removal area in the 2D image; identifying objects in the removal area; identifying at least one sample area in the 2D image; replacing identified objects in the removal area with at least one sample area; and displaying the modified image on a display unit.

2. The method of claim 1, wherein the 2D image includes a room in a building.

3. The method of claim 1 including the steps of
selecting a new object to insert into the 3D image;
modifying the new object based on the calculated dimensional attribute;
inserting the modified new object into the 3D image.

4. The method of claim 2 including the step of
identifying at least one wall in the room; and
determining the color attributes of the identified wall.

5. The method of claim 1 including the step of determining a location of an image capturing device that captured the 2D image in relation to the 3D image.

6. The method of claim 5 including the step of determining an attribute of the image capturing device based on the calculated dimension attribute and the gathered dimension attribute.

7. The method of claim 1 including the steps of
dividing the removal area into a plurality of rectangles of the same size,
wherein the sample area is larger than the size of each rectangle in the removal area.

8. The method of claim 7 including the step of comparing each rectangle in the removal area with each sample area to determine the sample area to insert into each rectangle in the removal area.

9. The method of claim 2, wherein the gathered image dimension attribute is the width of an object on a sidewall of the room.

10. An image conversion system comprising a memory and at least one processor, the image conversion system including: an image receiving unit configured to receive and store a two dimensional (2D) image in the memory; an information gathering unit configured to receive and store at least one gathered image attribute of the 2D image in the memory; an information gathering unit configured to receive an image analysis unit configured to calculate at least one calculated dimension attribute of the 2D image based on the at least one gathered image attribute, and identify corners and light sources in a space of the 2D image; an image conversion unit configured to convert the 2D image into a 3D image based on the identified corners, the calculated dimension attribute and the gathered dimension attribute, and to create a modified image from the 3D image, and shading at least one three dimensional object or at least one plane in the space based on the identified light sources; where the image analysis unit identifies a removal area in the 2D image; the image analysis unit identifies objects in the removal area; the image analysis unit identifies at least one sample area in the 2D image; the image analysis unit replaces the identified objects in the removal area with at least one sample area, and an image display unit that displays the modified image.

11. The image conversion system of claim 10, wherein the 2D image includes a room in a building.

12. The image conversion system of claim 10 including an object selection unit that selects a new object to insert into the 3D image, wherein, the image conversion unit modifies the new object based on the calculated dimensional attribute and inserts the modified new object into the 3D image.

13. The image conversion system of claim 11 wherein the image analysis unit identifies at least one wall in the room, and determines the color attributes of the identified wall.

14. The image conversion system of claim 10 wherein the image analysis unit determines the location of an image capturing device that captured the 2D image in relation to the 3D image.

15. The image conversion system of claim 14 wherein the image analysis unit determines an attribute of the image capturing device based on the calculated dimension attribute and the gathered dimension attribute.

16. The image conversion system of claim 10 wherein the image analysis unit divides the removal area into a plurality of rectangles of substantially the same size, wherein the sample area is larger than the size of each rectangle in the removal area.

17. The image conversion system of claim 16 wherein the image analysis unit compares each rectangle in the removal area with each sample area to determine the sample area to insert into each rectangle in the removal area.

18. The image conversion system of claim 11, wherein the gathered image dimension attribute is the width of an object on a sidewall of the room.

* * * * *

UNITED STATES PATENT AND TRADEMARK OFFICE
CERTIFICATE OF CORRECTION

| | |
|---|---|
| PATENT NO. | : 9,129,438 B2 |
| APPLICATION NO. | : 13/352959 |
| DATED | : September 8, 2015 |
| INVENTOR(S) | : Petrus Arnoldus Johannes Jacobus Aarts et al. |

It is certified that error appears in the above-identified patent and that said Letters Patent is hereby corrected as shown below:

In the Claims

Column 9, line 50, Claim 1, "comers" to read as --corners--.

Signed and Sealed this
Third Day of May, 2016

Michelle K. Lee
*Director of the United States Patent and Trademark Office*